(12) United States Patent
Li (10) Patent No.: US 11,290,801 B2
(45) Date of Patent: Mar. 29, 2022

(54) HEADSET CHARGING SYSTEM AND HEADSET CHARGING METHOD

(71) Applicant: Merry Electronics(Shenzhen) Co., Ltd., ShenZhen (CN)

(72) Inventor: Hung-Yuan Li, New Taipei (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 264 days.

(21) Appl. No.: 16/583,261

(22) Filed: Sep. 26, 2019

(65) Prior Publication Data

US 2020/0359123 A1 Nov. 12, 2020

(30) Foreign Application Priority Data

May 7, 2019 (TW) .................................. 108115694

(51) Int. Cl.
*H04R 1/10* (2006.01)
*H02J 7/02* (2016.01)
*H02J 7/04* (2006.01)
*H02J 7/00* (2006.01)

(52) U.S. Cl.
CPC .............. *H04R 1/1025* (2013.01); *H02J 7/00* (2013.01); *H02J 7/00712* (2020.01); *H02J 7/00714* (2020.01); *H02J 7/00718* (2020.01); *H02J 7/02* (2013.01); *H02J 7/022* (2013.01); *H02J 7/045* (2013.01); *H04R 1/1091* (2013.01); *H02J 7/007182* (2020.01); *H02J 7/007184* (2020.01); *H02J 2207/10* (2020.01); *H02J 2207/20* (2020.01); *H04R 2420/07* (2013.01)

(58) Field of Classification Search
CPC ................ H04R 1/1025; H04R 1/1091; H04R 2420/07; H04R 2201/107; H02J 7/00714; H02J 7/00718; H02J 7/00712; H02J 7/00; H02J 7/02; H02J 7/007184; H02J 7/007182; H02J 2207/20; H02J 2207/10; H02J 2207/30; H02J 7/342
USPC ....................................................... 320/149
See application file for complete search history.

(56) References Cited

U.S. PATENT DOCUMENTS

| | | | | |
|---|---|---|---|---|
| 6,835,491 B2 * | 12/2004 | Gartstein | ............ | H01M 6/5044 429/92 |
| 8,084,999 B2 * | 12/2011 | Esnard | .................. | H02J 7/0071 320/136 |
| 8,265,326 B2 * | 9/2012 | Singh | .................... | H04W 88/02 381/374 |
| 9,282,620 B2 * | 3/2016 | Choi | ...................... | H05B 41/34 |

(Continued)

*Primary Examiner* — M Baye Diao
(74) *Attorney, Agent, or Firm* — JCIPRNET (57) ABSTRACT

A headset charging system and a headset charging method are provided. The headset charging system includes a headset device and a charging device. The headset device includes a headset battery. The headset battery is configured to supply power required for operation of the headset device. The charging device is configured to accommodate and couple to the headset device. The charging device provides an output voltage and a charging current to charge the headset battery. The charging device detects whether a current value of the charging current is less than a first reference current value in a first mode. If the current value of the charging current is less than the first reference current value, the charging device raises a voltage value of the output voltage to maintain the current value of the charging current at the first reference current value.

13 Claims, 4 Drawing Sheets (56) References Cited

U.S. PATENT DOCUMENTS

| | | | |
|---|---|---|---|
| 9,577,587 B2* | 2/2017 | Maru | H03F 1/0277 |
| 9,713,726 B1* | 7/2017 | Dellamano | A61N 1/36125 |
| 10,601,238 B2* | 3/2020 | Chang | H02J 7/00 |
| 10,641,831 B2* | 5/2020 | Fu | H02J 7/0047 |
| 10,812,024 B2* | 10/2020 | King | H03F 1/0277 |
| 11,088,558 B2* | 8/2021 | Jung | B60L 53/11 |
| 2009/0141918 A1* | 6/2009 | Chris | H04R 5/0335 |
| | | | 381/315 |
| 2009/0243553 A1* | 10/2009 | Walley | H02J 7/0068 |
| | | | 320/162 |
| 2017/0310122 A1* | 10/2017 | Chang | H02J 7/007 |
| 2020/0266648 A1* | 8/2020 | Ha | H02J 7/007182 |

* cited by examiner

HEADSET CHARGING SYSTEM AND HEADSET CHARGING METHOD

CROSS-REFERENCE TO RELATED APPLICATION

This application claims the priority benefit of Taiwan application serial no. 108115694, filed on May 7, 2019. The entirety of the above-mentioned patent application is hereby incorporated by reference herein and made a part of this specification.

BACKGROUND OF THE INVENTION

Field of the Invention

The disclosure relates to a charging technique, and more particularly, to a headset charging system and a headset charging method.

Description of Related Art

A wireless headset is generally provided with a battery configured to supply power required for operation of the wireless headset. In addition, the wireless headset often comes with a dedicated headset charging case. The headset charging case may be used to accommodate the wireless headset and provide an output voltage to charge the battery of the wireless headset.

Specifically, the wireless headset usually has a built-in charger circuit that converts the output voltage provided by the headset charging case into a battery voltage to charge the battery of the wireless headset. However, the output voltage provided by the headset charging cases currently available is usually a fixed voltage. If the voltage difference between the output voltage provided by the headset charging case and the battery voltage is excessively large, the power conversion efficiency of the charger circuit of the wireless headset would be reduced, and the power of the headset charging case would be wasted.

SUMMARY OF THE INVENTION

In view of the above, the invention provides a headset charging system and a headset charging method, which can effectively improve the power conversion efficiency of the headset charging system.

A headset charging system of the invention includes a headset device and a charging device. The headset device includes a headset battery configured to supply power required for operation of the headset device. The charging device is configured to accommodate and couple to the headset device and provides an output voltage and a charging current to charge the headset battery. The charging device detects whether a current value of the charging current is less than a first reference current value in a first mode. If the current value of the charging current is less than the first reference current value, the charging device raises a voltage value of the output voltage to maintain the current value of the charging current at the first reference current value.

In an embodiment of the invention, the first reference current value is a maximum charging current value of the headset battery.

In an embodiment of the invention, the charging device includes a power conversion circuit, a current detecting circuit, and a control circuit. The power conversion circuit is configured to receive an input voltage and is controlled by a control signal to convert the input voltage into the output voltage and provide the charging current. The current detecting circuit is coupled to the power conversion circuit and is configured to detect the charging current to generate a sensing voltage. The control circuit is coupled to the power conversion circuit and the current detecting circuit and is configured to generate the control signal according to the sensing voltage. In the first mode, the control circuit determines whether the current value of the charging current is less than the first reference current value according to the sensing voltage. If the current value of the charging current is less than the first reference current value, the control circuit adjusts a duty cycle or a frequency of the control signal, so that the power conversion circuit raises the voltage value of the output voltage by a predetermined voltage value.

In an embodiment of the invention, the power conversion circuit includes a boost circuit and a buck circuit. In the first mode, if the input voltage is higher than the output voltage, the control circuit activates the buck circuit and disables the boost circuit, and the buck circuit performs a buck conversion on the input voltage according to the control signal to generate the output voltage. If the input voltage is lower than the output voltage, the control circuit activates the boost circuit and disables the buck circuit, and the boost circuit performs a boost conversion on the input voltage according to the control signal to generate the output voltage.

In an embodiment of the invention, the headset device further includes a charger circuit. The charger circuit is coupled to the headset battery and is configured to receive the output voltage and the charging current from the charging device. The charger circuit converts the output voltage into a charging voltage and charges the headset battery with the charging voltage and the charging current.

In an embodiment of the invention, the charging device operates in a second mode before the charging device enters the first mode. In the second mode, the control circuit activates the buck circuit and disables the boost circuit, so that the buck circuit performs a buck conversion on the input voltage according to the control signal to set the voltage value of the output voltage to an initial voltage value, and the control circuit determines whether the current value of the charging current gradually increases according to the sensing voltage. If the current value of the charging current gradually increases, the buck circuit maintains the voltage value of the output voltage at the initial voltage value to charge the headset battery accordingly. If the current value of the charging current does not gradually increase or the current value of the charging current increases to a second reference current value, the charging device enters the first mode. The initial voltage value is a sum of a discharging termination voltage value of the headset battery and a minimum dropout voltage of the charger circuit, and the second reference current value is less than the first reference current value.

In an embodiment of the invention, the control circuit further generates the control signal according to the output voltage. In the first mode, when the voltage value of the output voltage is equal to a threshold voltage value, the charging device enters a third mode, and the control circuit stops adjusting the duty cycle of the control signal in the third mode, so that the power conversion circuit maintains the voltage value of the output voltage at the threshold voltage value. The threshold voltage value is a sum of a rated voltage value of the headset battery and a minimum dropout voltage of the charger circuit.

In an embodiment of the invention, the charging device further includes a rechargeable battery. The rechargeable battery is coupled to the power conversion circuit and is configured to provide the input voltage to the power conversion circuit. When the input voltage is less than or equal to a reference voltage, the control circuit controls the power conversion circuit to stop providing the output voltage and the charging current.

A headset charging method of the invention includes the following steps. A charging device provides an output voltage and a charging current to charge a headset battery of a headset device. The charging device detects whether a current value of the charging current is less than a first reference current value in a first mode. If the current value of the charging current is less than the first reference current value, the charging device raises a voltage value of the output voltage to maintain the current value of the charging current at the first reference current value.

Based on the above, in the headset charging system and the headset charging method provided in the embodiments of the invention, when the current value of the charging current is less than the first reference current value, the voltage value of the output voltage can be raised to maintain the current value of the charging current at the first reference current value. Accordingly, the voltage difference between the output voltage and the charging voltage (i.e., the voltage of the headset battery) can be prevented from being excessively large, so that the power conversion efficiency of the headset device can be effectively improved, and the power of the charging device can be saved.

To make the aforementioned more comprehensible, several embodiments accompanied with drawings are described in detail as follows.

DESCRIPTION OF THE EMBODIMENTS

To provide a further understanding of the content of the invention, embodiments will be provided below as examples for implementing the invention accordingly. In addition, wherever possible, elements, components, and steps labeled with the same reference numerals in the drawings and embodiments refer to the same or similar components.

Figure 1:
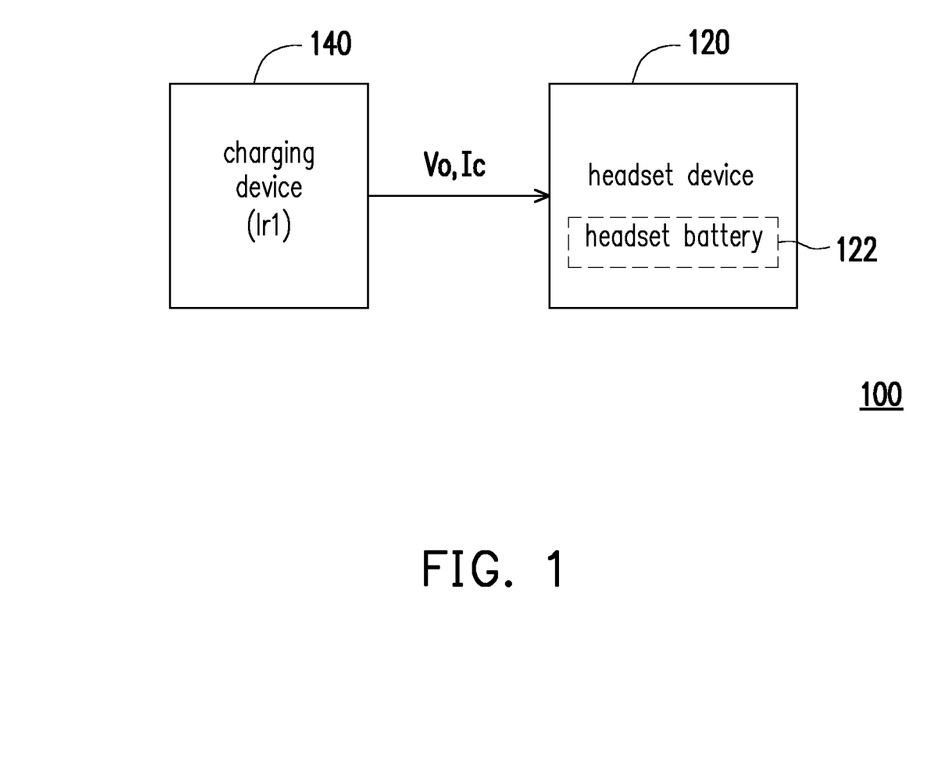
FIG. 1 is a block diagram showing a headset charging system according to an embodiment of the invention.

FIG. 1 is a block diagram showing a headset charging system according to an embodiment of the invention. Referring to FIG. 1, a headset charging system 100 includes a headset device 120 and a charging device 140. The headset device 120 includes a headset battery 122. The headset battery 122 is configured to supply power required for operation of the headset device 120. The charging device 140 is configured to accommodate the headset device 120 and may be coupled to the headset device 120. When the headset device 120 is placed in the charging device 140, and the charging pin of the headset device 120 is coupled to the charging pin of the charging device 140, the charging device 140 may provide an output voltage Vo and a charging current Ic through its charging pin to charge the headset battery 122.

Specifically, the charging device 140 may detect whether the current value of the charging current Ic is less than a first reference current value Ir1 in a first mode. If the current value of the charging current Ic is less than the first reference current value Ir1, the charging device 140 raises the voltage value of the output voltage Vo to maintain the current value of the charging current Ic at the first reference current value Ir1. Accordingly, the output voltage Vo provided by the charging device 140 may be prevented from being excessively high, which causes the voltage difference between the output voltage Vo and the voltage of the headset battery 122 to be excessively large. If the voltage difference between the output voltage Vo provided by the charging device 140 and the voltage of the headset battery 122 is excessively large, the power conversion efficiency of the headset device 120 is reduced, and the power of the charging device 140 is wasted.

In an embodiment of the invention, the headset device 120 may be, for example, an in-ear wireless headset, but the invention is not limited thereto. The invention does not limit the type of the headset device 120.

In an embodiment of the invention, the charging device 140 may be, for example, a headset charging case, but the invention is not limited thereto.

In an embodiment of the invention, the first reference current value Ir1 may be, for example, the maximum charging current value of the headset battery 122, but the invention is not limited thereto.

Figure 2:
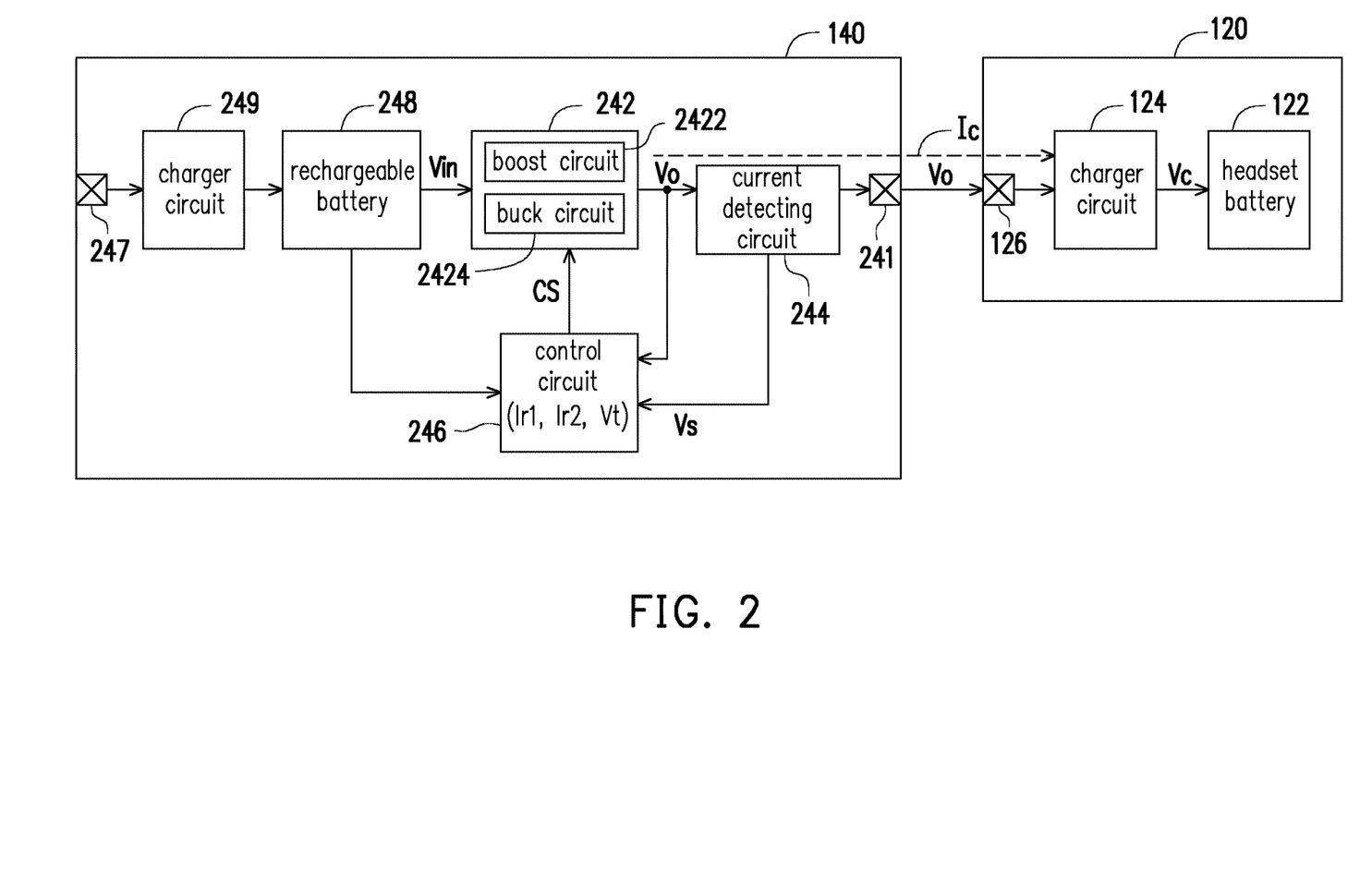
FIG. 2 is a circuit block diagram showing a headset device and a charging device according to an embodiment of the invention.

FIG. 2 is a circuit block diagram showing a headset device and a charging device according to an embodiment of the invention. Referring to FIG. 2, the charging device 140 may include a charging pin 241, a power conversion circuit 242, a current detecting circuit 244, and a control circuit 246, but the invention is not limited thereto. The power conversion circuit 242 is configured to receive an input voltage Vin and is controlled by a control signal CS to convert the input voltage Vin into the output voltage Vo and provide the charging current Ic. The output voltage Vo and the charging current Ic may be provided to the headset device 120 through the current detecting circuit 244 and the charging pin 241. The current detecting circuit 244 is coupled between the power conversion circuit 242 and the charging pin 241 and is configured to detect the charging current Ic to generate a sensing voltage Vs. The control circuit 246 is coupled to the power conversion circuit 242 and the current detecting circuit 244 and is configured to generate the control signal CS according to the sensing voltage Vs and the output voltage Vo.

More specifically, in the first mode, the control circuit 246 may determine whether the current value of the charging current Ic is less than the first reference current value Ir1 according to the sensing voltage Vs. If the current value of the charging current Ic is less than the first reference current value Ir1, the control circuit 246 may adjust the duty cycle or frequency of the control signal CS, so that the power conversion circuit 242 raises the voltage value of the output voltage Vo by a predetermined voltage value. The predetermined voltage value may be determined according to the actual implementation or design requirements.

In an embodiment of the invention, the power conversion circuit 242 may include a boost circuit 2422 and a buck circuit 2424, but the invention is not limited thereto. In the first mode, the control circuit 246 may determine the magnitude relationship between the input voltage Vin and the output voltage Vo. If the input voltage Vin is higher than the output voltage Vo, the control circuit 246 activates the buck circuit 2424 and disables the boost circuit 2422, so that the buck circuit 2424 performs a buck conversion on the input voltage Vin according to the control signal CS to generate the output voltage Vo. In contrast, if the input voltage Vin is lower than the output voltage Vo, the control circuit 246 activates the boost circuit 2422 and disables the buck circuit 2424, so that the boost circuit 2422 perform a boost conversion on the input voltage Vin according to the control signal CS to generate the output voltage Vo.

In an embodiment of the invention, the charging device 140 may further include a rechargeable battery 248, a charger circuit 249, and a power input port 247, but the invention is not limited thereto. The rechargeable battery 248 is coupled to the power conversion circuit 242 and the control circuit 246. The rechargeable battery 248 is configured to provide the input voltage Vin to the power conversion circuit 242. When the input voltage Vin is less than or equal to a reference voltage, it means that the rechargeable battery 248 is about to run out of power, so the control circuit 246 controls the power conversion circuit 242 to stop providing the output voltage Vo and the charging current Ic. In addition, the charger circuit 249 is coupled between the rechargeable battery 248 and the power input port 247 and is configured to receive an external power through the power input port 247 and perform power conversion on the external power to charge the rechargeable battery 248.

The headset device 120 includes the headset battery 122, a charger circuit 124, and a charging pin 126, but the invention is not limited thereto. The charging pin 126 of the headset device 120 may be coupled to the charging pin 241 of the charging device 140. The charger circuit 124 is coupled between the charging pin 126 and the headset battery 122. The charger circuit 124 may receive the output voltage Vo and the charging current Ic from the charging device 140 through the charging pin 126. The charger circuit 124 may convert the output voltage Vo into a charging voltage Vc and charge the headset battery 122 with the charging voltage Vc and the charging current Ic. The charging voltage Vc is namely the voltage of the headset battery 122.

In an embodiment of the invention, the boost circuit 2422 and the buck circuit 2424 may be implemented respectively by using a boost conversion circuit and a buck conversion circuit currently available.

In an embodiment of the invention, the control circuit 246 may be, for example, a microprocessor, a programmable controller, an application specific integrated circuit (ASIC), another similar device, or a combination of the above devices, but the invention is not limited thereto.

In an embodiment of the invention, the charging pin 241 of the charging device 140 and the charging pin 126 of the headset device 120 may be, for example, pogo pins, but the invention is not limited thereto.

In an embodiment of the invention, the power input port 247 may be, for example, a Universal Serial Bus (USB) port, but the invention is not limited thereto.

In an embodiment of the invention, the charger circuit 249 of the charging device 140 and the charger circuit 124 of the headset device 120 may be, for example, battery charger integrated circuits, but the invention is not limited thereto.

In an embodiment of the invention, the battery capacity of the rechargeable battery 248 is greater than the battery capacity of the headset battery 122, but the invention is not limited thereto. In an embodiment of the invention, the rechargeable battery 248 and the headset battery 122 may be, for example, nickel-zinc batteries, nickel-hydrogen batteries, lithium ion batteries, lithium polymer batteries, or rechargeable batteries based on lithium iron phosphate, but the invention is not limited to thereto.

Figure 3:
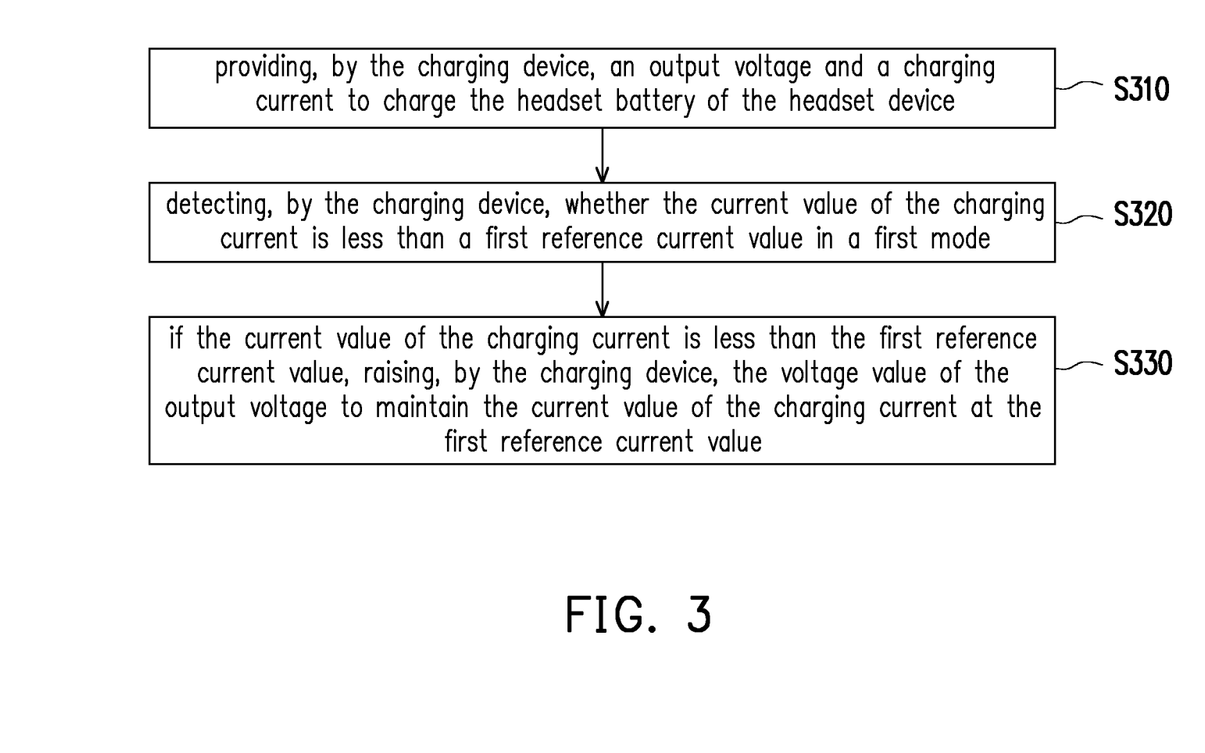
FIG. 3 is a flowchart showing steps of a headset charging method according to an embodiment of the invention.

FIG. 3 is a flowchart showing steps of a headset charging method according to an embodiment of the invention, which may be applied to the headset charging system 100 shown in FIG. 1 and the charging device 140 and the headset device 120 shown in FIG. 2, but the invention is not limited thereto. Referring to FIG. 1 to FIG. 3 together, the headset charging method of the present exemplary embodiment includes the following steps. First, in step S310, the charging device 140 provides an output voltage Vo and a charging current Ic to charge the headset battery 122 of the headset device 120. Next, in step S320, the charging device 140 detects whether the current value of the charging current Ic is less than a first reference current value Ir1 in a first mode. Then, in step S330, if the current value of the charging current Ic is less than the first reference current value Ir1, the charging device 140 raises the voltage value of the output voltage Vo to maintain the current value of the charging current Ic at the first reference current value Ir1.

In an embodiment of the invention, the headset charging method may further include the following step. The charger circuit 124 of the headset device 120 converts the output voltage Vo into a charging voltage Vc and charges the headset battery 122 with the charging voltage Vc and the charging current Ic.

In an embodiment of the invention, in addition to operating in the first mode, the charging device 140 may also operate in a second mode and a third mode. The steps of the first mode, the second mode, and the third mode will be further described below.

Figure 4:
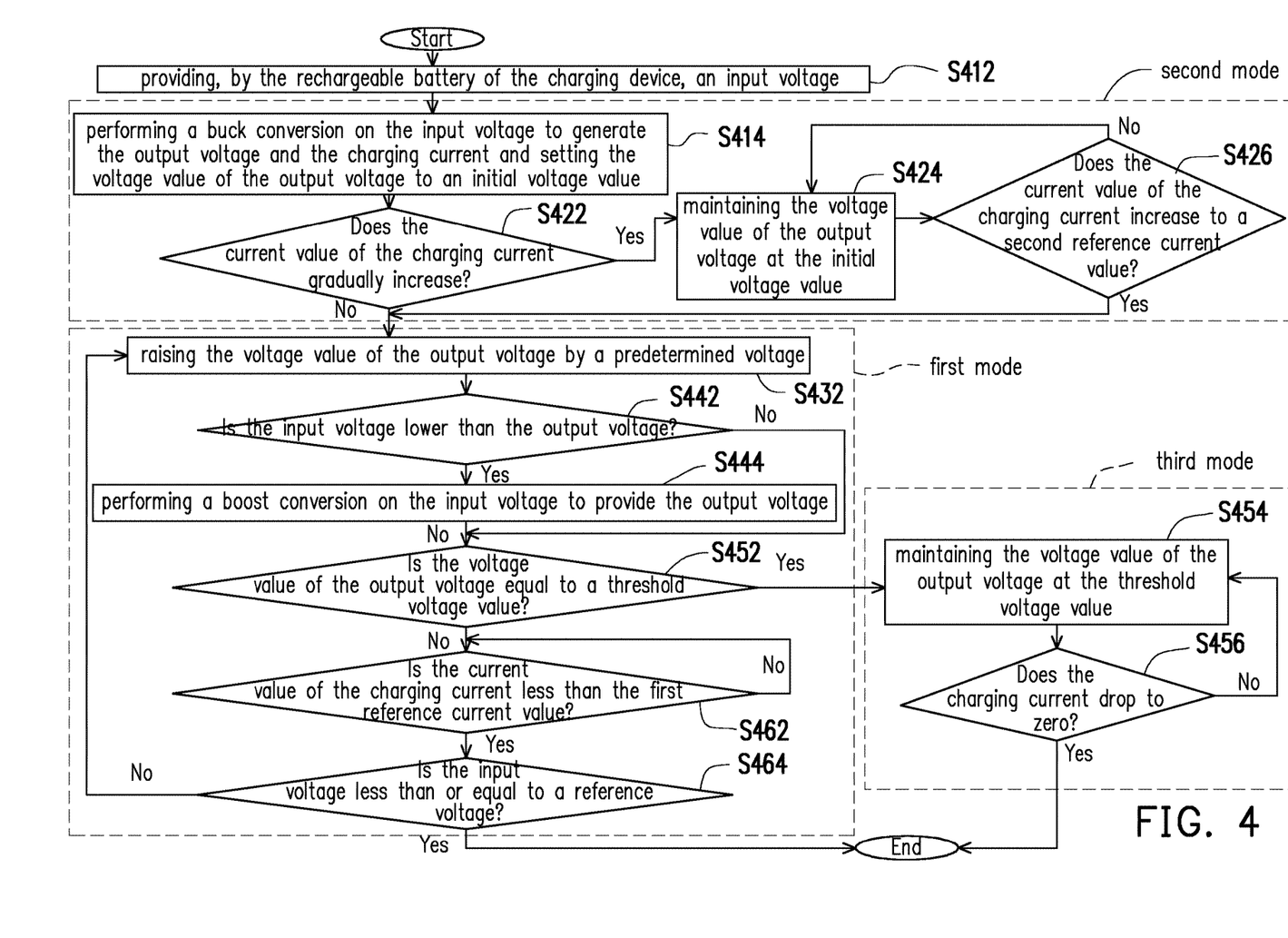
FIG. 4 is a flowchart showing detailed steps of the headset charging method according to an embodiment of the invention.

FIG. 4 is a flowchart showing detailed steps of the headset charging method according to an embodiment of the invention. Referring to FIG. 2 to FIG. 4 together, first, step S310 of FIG. 3 may include detailed steps S412 and S414. In step S412, the rechargeable battery 248 of the charging device 140 provides an input voltage Vin. Next, in the second mode, the charging device 140 performs a buck conversion on the input voltage Vin to generate the output voltage Vo and the charging current Ic and set the voltage value of the output voltage Vo to an initial voltage value, as shown in step S414. Specifically, before the charging device 140 enters the first mode, the charging device 140 operates in the second mode. In the second mode, the control circuit 246 activates the buck circuit 2424 and disables the boost circuit 2422, so that the buck circuit 2424 performs a buck conversion on the input voltage Vin according to a control signal CS to set the voltage value of the output voltage Vo to the initial voltage value.

It is noted that the initial voltage value is the sum of the discharging termination voltage value of the headset battery 122 (i.e., the headset battery 122 is in a low voltage state, e.g., less than 3 volts) and the minimum dropout voltage of the charger circuit 124. The minimum dropout voltage of the charger circuit 124 is the minimum voltage difference between the input voltage of the charger circuit 124 and the output voltage of the charger circuit 124. For example, if the discharging termination voltage value of the headset battery 122 is 3 volts and the minimum dropout voltage of the charger circuit 124 is 0.55 volts, the voltage value of the output voltage Vo is set to 3.55 volts in step S414.

Then, in the second mode, the charging device 140 detects whether the current value of the charging current Ic gradually increases, as shown in step S422. Specifically, the control circuit 246 may determine whether the current value of the charging current Ic gradually increases according to a sensing voltage Vs. If the detection result of step S422 is "No" (i.e., the current value of the charging current Ic does not gradually increase), it means that the voltage of the headset battery 122 is not a low voltage (for example, the voltage of the headset battery 122 is equal to or higher than the discharging termination voltage value), and the charging device 140 enters the first mode. If the detection result of step S422 is "Yes" (i.e., the current value of the charging current Ic gradually increases), it means that the voltage of the headset battery 122 is a low voltage (for example, the voltage of the headset battery 122 is lower than the discharging termination voltage value), and in step S424, the buck circuit 2424 of the charging device 140 maintains the voltage value of the output voltage Vo at the initial voltage value to charge the headset battery 122 accordingly.

Afterwards, in step S426, the control circuit 246 determines whether the current value of the charging current Ic rises to a second reference current value Ir2, and the second reference current value Ir2 is less than the first reference current value Ir1. If the determination result of step S426 is "Yes", it means that the voltage of the headset battery 122 has risen to the discharging termination voltage value, and the charging device 140 enters the first mode. If the determination result of step S426 is "No", it means that the voltage of the headset battery 122 is still a low voltage, and returning to step S424, the voltage value of the output voltage Vo is maintained at the initial voltage value to charge the headset battery 122 accordingly. It is understood that, since the second reference current value Ir2 is less than the first reference current value Ir1, the charging current Ic provided by the charging device 140 in the second mode is less than the charging current Ic provided in the first mode.

After the charging device 140 enters the first mode from the second mode, in step S432, the power conversion circuit 242 may raise the voltage value of the output voltage Vo by a predetermined voltage value. Next, in step S442, the control circuit 246 determines whether the input voltage Vin is lower than the output voltage Vo. If the determination result of step S442 is "No", the charging device 140 still performs a buck conversion on the input voltage Vin to provide the output voltage Vo (i.e., the buck circuit 2424 performs a buck conversion on the input voltage Vin according to the control signal CS to generate the output voltage Vo), and then step S452 is performed. If the determination result of step S442 is "Yes", in step S444, the charging device 140 performs a boost conversion on the input voltage Vin to provide the output voltage Vo (i.e., the boost circuit 2422 performs a boost conversion on the input voltage Vin according to the control signal CS to generate the output voltage Vo).

Afterwards, in step S452, the control circuit 246 of the charging device 140 may determine whether the voltage value of the output voltage Vo is equal to a threshold voltage value Vt, and the threshold voltage value Vt is the sum of the rated voltage value of the headset battery 122 (i.e., the voltage value of the headset battery 122 when fully charged) and the minimum dropout voltage of the charger circuit 124. For example, if the rated voltage value of the headset battery 122 is 4.2 volts and the minimum dropout voltage of the charger circuit 124 is 0.55 volts, the threshold voltage value Vt may be set to 4.75 volts.

If the determination result of step S452 is "No", it means that the headset battery 122 is not fully charged. Next, in step S462, the control circuit 246 of the charging device 140 determines whether the charging current Ic is less than the first reference current value Ir1. If the determination result of step S462 is "No", it means that the voltage difference between the output voltage Vo and the charging voltage Vc is approximately the minimum dropout voltage of the charger circuit 124, so the voltage value of the output voltage Vo is not raised.

If the determination result of step S462 is "Yes", it means that the voltage of the headset battery 122 (i.e., the charging voltage Vc) rises as a result of the headset battery 122 being charged, so that the voltage difference between the output voltage Vo and the charging voltage Vc is lower than the minimum dropout voltage of the charger circuit 124. Therefore, in step S464, the control circuit 246 determines whether the input voltage Vin is less than or equal to a reference voltage. If the determination result of step S464 is "Yes", it means that the rechargeable battery 248 is about to run out of power, and the charging device 140 stops charging the headset battery 122 of the headset device 120 (i.e., the charging device 140 stops providing the output voltage Vo and the charging current Ic). If the determination result of step S464 is "No", it means that the rechargeable battery 248 still has power, and returning to step S432, the voltage value of the output voltage Vo is raised by a predetermined voltage value to maintain the charging current Ic at the first reference current value Ir1, so that the voltage difference between the output voltage Vo and the charging voltage Vc is approximately the minimum dropout voltage of the charger circuit 124.

In addition, if the determination result of step S452 is "Yes", it means that the headset battery 122 is about to be fully charged, so the charging device 140 enters the third mode, and in the third mode, the charging device 140 maintains the voltage value of the output voltage Vo at the threshold voltage value Vt to charge the headset battery 122 accordingly, as shown in step S454. Specifically, in the third mode, the control circuit 246 stops adjusting the duty cycle or frequency of the control signal CS, so that the power conversion circuit 242 maintains the voltage value of the output voltage Vo at the threshold voltage value Vt.

Next, in step S456, the control circuit 246 may determine whether the charging current Ic has dropped to zero. If the charging current Ic has not dropped to zero, returning to step S454, the charging device 140 continuously charges the headset battery 122 with the output voltage Vo (which is the threshold voltage value Vt). If the charging current Ic drops to zero, it means that the headset battery 122 is fully charged, and the charging device 140 stops charging the headset battery 122 (i.e., the charging device 140 stops providing the output voltage Vo and the charging current Ic).

It is noted that if the voltage difference between the output voltage Vo and the charging voltage Vc is maintained at the minimum dropout voltage of the charger circuit 124, the power conversion efficiency of the charger circuit 124 can be improved. For example, it is assumed that the voltage of the headset battery 122 at low power and full charge is respectively 3 volts and 4.2 volts, and the minimum dropout voltage of the charger circuit 124 is 0.55 volts. Therefore, when the voltage of the headset battery 122 (i.e., the charging voltage Vc) is 3 volts, the output voltage Vo is 3.55 volts, so the power conversion efficiency of the charger circuit 124 is 3÷3.55=84.5%. When the voltage of the headset battery 122 (i.e., the charging voltage Vc) is 4.2 volts, the output voltage Vo is 4.75 volts, so the power conversion efficiency of the charger circuit 124 is 4.2÷4.75=88.4%. Accordingly, the average power conversion efficiency of the charger circuit 124 is approximately (84.5%30 88.4%)÷2=86.45%.

In contrast, if the output voltage Vo provided by the charging device 140 is always maintained at a fixed value of 5 volts, when the voltage of the headset battery 122 (i.e., the charging voltage Vc) is 3 volts, the power conversion efficiency of the charger circuit 124 is 3÷5=60%, and when the voltage of the headset battery 122 (i.e., the charging voltage Vc) is 4.2 volts, the power conversion efficiency of the charger circuit 124 is 4.2÷5=84%. Accordingly, the average power conversion efficiency of the charger circuit 124 is approximately (60%+84%)÷2=72%.

Therefore, by maintaining the charging current Ic at the first reference current value Ir1 to cause the voltage difference between the output voltage Vo and the charging voltage Vc to be approximately the minimum dropout voltage of the charger circuit 124, the power conversion efficiency of the charger circuit 124 can be effectively improved, and the power of the rechargeable battery 248 of the charging device 140 can thereby be saved.

In summary of the above, in the headset charging system and the headset charging method provided in the embodiments of the invention, when the current value of the charging current is less than the first reference current value, the voltage value of the output voltage can be raised to maintain the current value of the charging current at the first reference current value. Accordingly, the voltage difference between the output voltage and the charging voltage (i.e., the voltage of the headset battery) can be prevented from being excessively large, so that the power conversion efficiency of the headset device can be effectively improved, and the power of the charging device can be saved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A headset charging system comprising:
a headset device, comprising a headset battery configured to supply power required for operation of the headset device;
a charging device, configured to accommodate and couple to the headset device, and providing an output voltage and a charging current to charge the headset battery, wherein the charging device detects whether a current value of the charging current is less than a first reference current value in a first mode, and if the current value of the charging current is less than the first reference current value, the charging device raises a voltage value of the output voltage to maintain the current value of the charging current at the first reference current value; and
a power conversion circuit, configured to receive an input voltage, and controlled by a control signal to convert the input voltage into the output voltage and provide the charging current, wherein the power conversion circuit comprises a boost circuit and a buck circuit, wherein in the first mode:
if the input voltage is higher than the output voltage, the control circuit activates the buck circuit and disables the boost circuit, and the buck circuit performs a buck conversion on the input voltage according to the control signal to generate the output voltage, and
if the input voltage is lower than the output voltage, the control circuit activates the boost circuit and disables the buck circuit, and the boost circuit performs a boost conversion on the input voltage according to the control signal to generate the output voltage.

2. The headset charging system according to claim 1, wherein the first reference current value is a maximum charging current value of the headset battery.

3. The headset charging system according to claim 1, wherein the charging device comprises:
a current detecting circuit, coupled to the power conversion circuit, and configured to detect the charging current to generate a sensing voltage; and
a control circuit, coupled to the power conversion circuit and the current detecting circuit, and configured to generate the control signal according to the sensing voltage,
wherein in the first mode, the control circuit determines whether the current value of the charging current is less than the first reference current value according to the sensing voltage, and if the current value of the charging current is less than the first reference current value, the control circuit adjusts a duty cycle or a frequency of the control signal, so that the power conversion circuit raises the voltage value of the output voltage by a predetermined voltage value.

4. The headset charging system according to claim 3, wherein the charging device further comprises:
a rechargeable battery, coupled to the power conversion circuit, and configured to provide the input voltage to the power conversion circuit,
wherein when the input voltage is less than or equal to a reference voltage, the control circuit controls the power conversion circuit to stop providing the output voltage and the charging current.

5. The headset charging system according to claim 1, wherein the headset device further comprises:
a charger circuit, coupled to the headset battery, and configured to receive the output voltage and the charging current from the charging device, wherein the charger circuit converts the output voltage into a charging voltage and charges the headset battery with the charging voltage and the charging current.

6. The headset charging system according to claim 5, wherein the charging device operates in a second mode before the charging device enters the first mode, wherein in the second mode:
the control circuit activates the buck circuit and disables the boost circuit, so that the buck circuit performs a buck conversion on the input voltage according to the control signal to set the voltage value of the output voltage to an initial voltage value, and the control circuit determines whether the current value of the charging current gradually increases according to the sensing voltage,
wherein if the current value of the charging current gradually increases, the buck circuit maintains the voltage value of the output voltage at the initial voltage value to charge the headset battery accordingly,
wherein if the current value of the charging current does not gradually increase or the current value of the charging current increases to a second reference current value, the charging device enters the first mode,
wherein the initial voltage value is a sum of a discharging termination voltage value of the headset battery and a minimum dropout voltage of the charger circuit, and the second reference current value is less than the first reference current value.

7. The headset charging system according to claim 5, wherein the control circuit further generates the control signal according to the output voltage, wherein in the first mode, when the voltage value of the output voltage is equal to a threshold voltage value, the charging device enters a third mode, and the control circuit stops adjusting the duty cycle of the control signal in the third mode, so that the power conversion circuit maintains the voltage value of the output voltage at the threshold voltage value, wherein the threshold voltage value is a sum of a rated voltage value of the headset battery and a minimum dropout voltage of the charger circuit.

8. A headset charging method comprising:

providing, by a charging device, an output voltage and a charging current to charge a headset battery of a headset device;

detecting, by the charging device, whether a current value of the charging current is less than a first reference current value in a first mode;

if the current value of the charging current is less than the first reference current value, raising, by the charging device, a voltage value of the output voltage to maintain the current value of the charging current at the first reference current value; and converting, by a charger circuit of the headset device, the output voltage into a charging voltage and charging the headset battery with the charging voltage and the charging current, wherein the step of providing, by the charging device, the output voltage and the charging current comprises:

providing, by a rechargeable battery of the charging device, an input voltage; and in a second mode before the first mode, performing, by the charging device, a buck conversion on the input voltage to generate the output voltage and the charging current, and setting the voltage value of the output voltage to an initial voltage value, wherein the initial voltage value is a sum of a discharging termination voltage value of the headset battery and a minimum dropout voltage of the charger circuit.

9. The headset charging method according to claim 8, wherein the first reference current value is a maximum charging current value of the headset battery.

10. The headset charging method according to claim 8, further comprising:

in the second mode, detecting, by the charging device, whether the current value of the charging current gradually increases;

if the current value of the charging current gradually increases, maintaining, by the charging device, the voltage value of the output voltage at the initial voltage value to charge the headset battery accordingly; and if the current value of the charging current does not gradually increase or the current value of the charging current increases to a second reference current value, letting the charging device enter the first mode, wherein the second reference current value is less than the first reference current value.

11. The headset charging method according to claim 8, further comprising:

in the first mode, if the input voltage is higher than the output voltage, performing, by the charging device, a buck conversion on the input voltage to provide the output voltage; and in the first mode, if the input voltage is lower than the output voltage, performing, by the charging device, a boost conversion on the input voltage to provide the output voltage.

12. The headset charging method according to claim 8, further comprising:

in the first mode, determining, by the charging device, whether the voltage value of the output voltage is equal to a threshold voltage value; and if the voltage value of the output voltage is equal to the threshold voltage value, letting the charging device enter a third mode, and maintaining, by the charging device, the voltage value of the output voltage at the threshold voltage value in the third mode, wherein the threshold voltage value is a sum of a rated voltage value of the headset battery and a minimum dropout voltage of the charger circuit.

13. The headset charging method according to claim 8, further comprising:

determining, by the charging device, whether the input voltage is less than or equal to a reference voltage; and if the input voltage is less than or equal to a reference voltage, stopping providing the output voltage and the charging current.

\* \* \* \* \*